United States Patent [19]
Krimmer et al.

[11] Patent Number: 5,651,530
[45] Date of Patent: Jul. 29, 1997

[54] ELECTROMAGNETICALLY OPERATED PRESSURE SWITCHING VALVE

[75] Inventors: Erwin Krimmer, Pluederhausen; Tilman Miehle, Kernen; Steffen Schumacher, Renningen, all of Germany

[73] Assignee: Robert Bosch GmbH, Stuttgart, Germany

[21] Appl. No.: 572,803

[22] Filed: Dec. 15, 1995

[30] Foreign Application Priority Data

Mar. 23, 1995 [DE] Germany ............ 195 10 646.6

[51] Int. Cl.$^6$ ...................................... F16K 31/06
[52] U.S. Cl. .................. 251/129.21; 137/625.25; 335/279
[58] Field of Search ............ 251/129.21, 129.15, 251/129.16; 137/625.65; 335/255, 279

[56] References Cited

U.S. PATENT DOCUMENTS

| | | | |
|---|---|---|---|
| 3,013,768 | 12/1961 | Mastra | 251/129.15 |
| 4,531,708 | 7/1985 | Livet | 251/129.21 X |
| 4,538,129 | 8/1985 | Fisher | 251/129.21 X |
| 4,846,439 | 7/1989 | Suzuki | 251/129.21 X |
| 5,158,263 | 10/1992 | Shimizu et al. | 251/129.21 |
| 5,289,841 | 3/1994 | Maranzano | 137/625.65 X |
| 5,414,398 | 5/1995 | Schumacher | 251/129.21 X |

FOREIGN PATENT DOCUMENTS 46-34461 9/1971 Japan .................. 251/129.21

*Primary Examiner*—Kevin Lee
*Attorney, Agent, or Firm*—Michael J. Striker

[57] ABSTRACT

An electromagnetically operated pressure switching valve has a valve housing, a magnet coil arranged inside the valve housing, a magnet core associated with the magnet coil and having a passage for a pressure medium provided with a valve seat, a magnet armature, a valve closing element arranged in the valve housing for controlling a flow of the pressure medium. The magnet armature has a portion extending in the magnet coil to an area of a greater magnetic flux density. The portion of the magnet armature cooperates with the valve seat of the passage and is limited by a ring-shaped circular flange-like edge extending outside of the magnet coil.

9 Claims, 1 Drawing Sheet

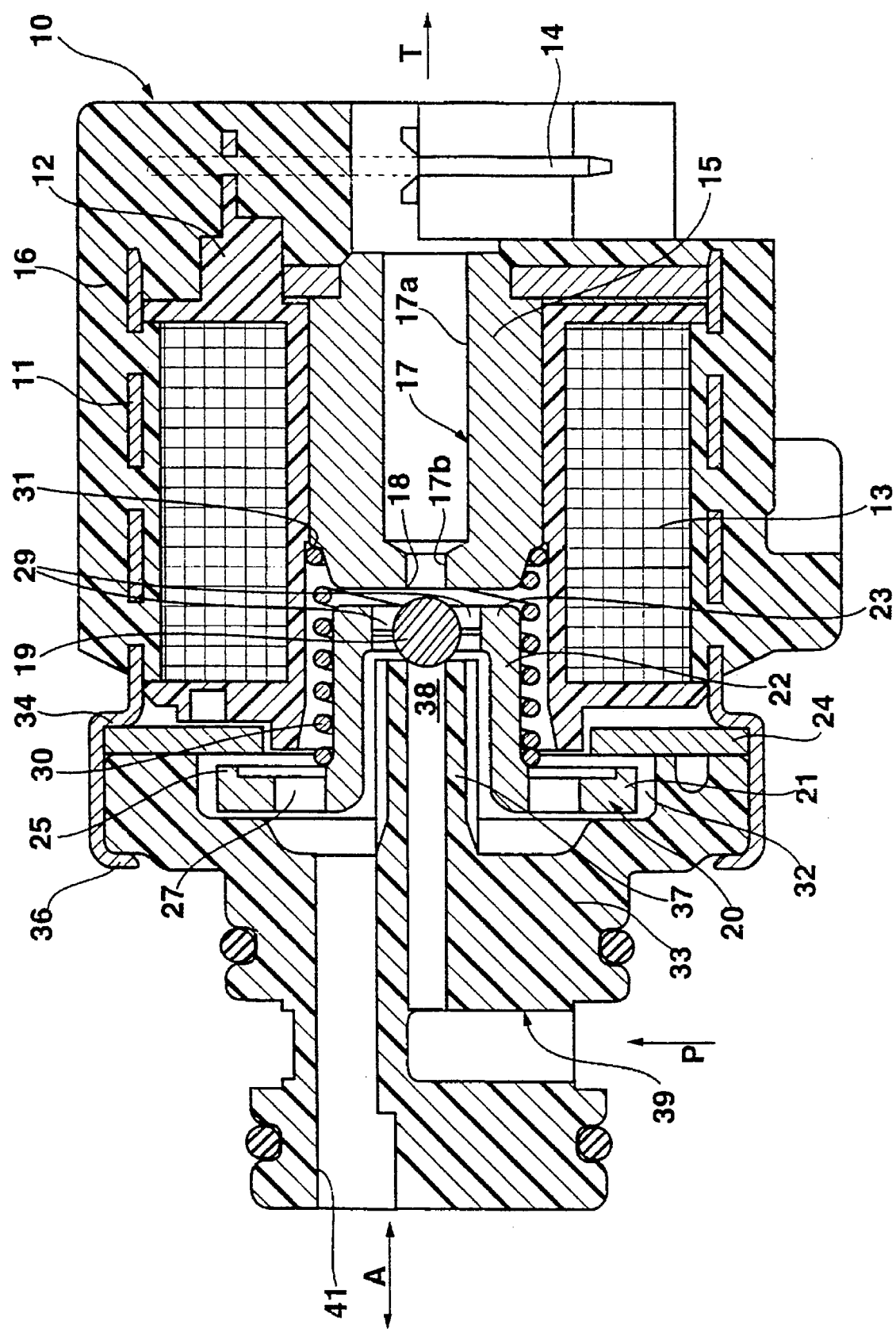

ELECTROMAGNETICALLY OPERATED PRESSURE SWITCHING VALVE

BACKGROUND OF THE INVENTION

The present invention relates to an electromagnetically operated pressure switching valve.

Electromagnetically operated pressure switching valves are generally known in the art. Such switches have either a cylindrical armature or a plate-shaped armature which cooperates with an opening in a magnet core, through which opening the pressure medium can flow. In this opening, the pressure medium flow is turned by the magnetic armature for example from a pump to a consumer in an automatic transmission of a motor vehicle. The pressure switching valve of this type has the disadvantage that during the utilization of a cylindrical armature this is susceptible to dirt in view of the narrow radial bearing gap between the armature and the magnet core and therefore has the tendency to be blocked. Furthermore, the efficient magnetic surface is limited by the relatively small cross-section of the cylindrical armature. A plate-shaped armature has the disadvantage that it has the tendency to tilting and thereby canting in some cases. Since its working air gap is located outside the coil and therefore outside of the highest magnetic flux density, its magnetic force is limited.

SUMMARY OF THE INVENTION

Accordingly, it is an object of the present invention to provide an electromagnetically operated pressure switching valve of the above mentioned general type, which avoids the disadvantages of the prior art.

In keeping with these objects and with others which will become apparent hereinafter, one feature of the present invention resides, briefly stated, in an electromagnetically operated pressure switching valve in which the magnet armature has a portion extending in the magnet coil to the point with the greatest magnetic flux density, and this portion cooperates with the valve seat of a passage 17, and the above mentioned portion of the magnetic armature is limited by a ring-shaped circular flange-like edge extending outside of the magnet coil.

When the pressure switching valve is designed in accordance with the present invention its armature is arranged in the interior of the coil in the region of the highest magnetic flux density, it is not susceptible to dirtying, and simultaneously it has a high effective magnetic surface for the armature.

Moreover, due to the special cross-sectional form, a relatively small mass of the magnet armature and thereby a high switching speed is obtained. With the special cross-sectional form, it is also possible to form passages for the pressure medium with low expenses.

In accordance with another feature of the present invention, the magnet armature can be produced in an especially simple manner as a one-part punch drawn element.

The valve element can be formed as a ball, and therefore an accurate valve seat and a simply adjustable valve stroke can be provided, in accordance with another feature of the present invention.

It is especially advantageous when the magnet armature is arranged in the region of the highest magnetic field intensity. Thereby during movement of the magnet armature a counter induction occurs in the magnet coil, which is recognized with an electronic circuit as an armature movement or can be supplied to a control device as a control value.

In accordance with a preferable embodiment of the present invention, the magnet armature is surrounded by a spring which ensures an axial guidance of the magnet armature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The drawing is a view showing a longitudinal section of an electromagnetically operated pressure switching valve in accordance with the present invention.

DESCRIPTION OF THE PREFERRED EMBODIMENTS

An electromagnetically operated pressure switching valve 10 shown in the drawing is a component of a not shown hydraulic system, for example an automatic transmission of a motor vehicle. It switches in a known manner a pressure medium flow between a pump P, a consumer A and a return tank T. The pressure switching valve 10 has a magnet coil 13 which is inserted in a metal sleeve 11 and wound on a coil body 12. The magnet coil 13 has electrical terminal 14. The switching valve further has a housing 16 formed by injection molding of a synthetic plastic mass over the sleeve 11 or the coil body 12 and the magnet coil 13. A magnet core 15 is arranged in the interior of the of the coil body 12. The length of the magnet core 15 amounts to approximately two-thirds of the lengths of the coil body 12. The magnet core 15 at the side which is facing the terminal 14 is closed substantially flush with the coil body 12.

A stepped opening 17 with opening portions 17a and 17b extends coaxially through the magnet core 15. The opening portion 17a which faces the terminal 14 and has a greater diameter communicates with the return tank T. The opening of the opening portion 17b forms a valve seat 18 for a valve ball 19. The valve ball 19 is pressed in an armature 20.

The armature 20 has a U-shaped cross-section with a flange-shaped circular edge 21. A portion 22 has a bottom 23 which extends from the armature 20 into the magnet coil 13 to all area with the greater magnetic flux density. This means that the portion 22 in the shown embodiment extends substantially to a third in the inner space of the magnet coil 13. The edge 21 is oriented with a pole disc 24 which is arranged parallel to the end surface of the magnet coil 13. The poll disc between the magnet coil 13 and the edge 21 of the armature 20 and connected with the sleeve 11. Furthermore, a supporting collar 25 is formed on the periphery of the edge 21 and extends toward the pole disc 24.

Axial passages 27 for the pressure medium, for example four such passages, are formed in the edge 21 and arranged at identical angular distances. Similarly, several recesses 29 for the pressure medium formed as passages, for example two such recesses are formed in the bottom 23 of the portion 22 laterally near the valve ball 19.

In one of the preferred embodiments, the armature 20 is formed as a one-piece punch drawn element. The passages 27 and the recesses 29 are formed in this case by punching out. Then, in the drawing step, the valve body 19 is pressed into the portion 22.

The portion 22 of the armature 20 is surrounded by a spring 30. The spring 30 abuts on the one side against the edge 21 and on the other side against a shoulder 31 formed on the periphery of the magnet coil 15. The spring 30 is arranged with radial play in the coil body 12. In the current-less condition of the magnet coil 13, the spring 30 is activated so as to leave the armature 20 or the valve ball 19 from the seat 18. Therefore a connection with the return tank T is provided through the seat 18. The edge 21 of the armature 20 is arranged with play in a substantially ring-shaped recess 32 of a valve closing element 33. The valve closing element 33 is connected with the sleeve 11 by a deformation process without removal of a material. In particular, after forming-in of a shoulder 34 in the sleeve 11, the composite element composed of the pole disc 24 and the valve closing element 33 is placed against the shoulder 34, and then projecting edge 36 of the sleeve 11 is flanged against the valve closing element 33. Thereby a tight connection is produced.

The valve closing element 33 which preferably is composed of a synthetic plastic material has a projection extending in the portion 22 approximately to the bottom 23. A further opening 38 is formed in the projection 33 coaxially to the opening portion 17b. The opening 38 has substantially the same diameter as the opening portion 17b. The opening 38 opens in the valve closing element 33 into a transverse opening 39 which is connected with the connection of the pump P. Furthermore, the displacement path of the armature 20 is selected so that in current-less condition of the magnet coil 13, the armature 20 is pressed by its valve ball 19 by the spring 30 against the opening 38 and tightly closes the same to the pump P.

A passage 41 which does not intersect the transverse opening 39 extends parallel to the opening 38 in the valve closing element 33. It opens into the recess 32 of the valve closing element 33 on the one side, and is connected with the consumer A on the other side.

The above described pressure switching valve 10 operates in the following manner:

When no current is supplied to the magnet coil 13, the magnet armature 20 is pressed by the force of the spring 30 in direction toward the projection 37 of the valve closing element 33. Therefore, the valve ball 19 seals the opening 38 from the pump P. A throughgoing connection is provided between the consumer A and the return tank T through the passage 41, the recess 32, the passages 27 and the recesses 29, as well as the opening portions 17b and 17a.

When current is supplied to the magnet coil 13, the armature 20 is attracted by the magnet core 15. Thereby the valve ball 19 is seated on the seat 18 and seals the opening 17 toward the return tank T. Therefore a throughgoing connection is provided between the pump P and the consumer A. This connection is formed by the transverse opening 39 and the opening 38, the ring-shaped gap between the projection 37 and the portion 22, the recess 32 as well as the passage 41.

During movement of the armature 20 it is especially advantageous that it is axially guided by the spring 30 and the projection 37 as well as by the supporting collar 25 in an axial direction and thereby the tendency for tilting is very small. Furthermore, the pressure regulating valve 10 is susceptible to dirt very little because of the special construction of the armature 20, since no narrow gaps are available for particles, in particular between the portion 22 and the magnet coil 13. Since the portion 22 of the armature 20 is arranged in the region of the greater magnetic field intensity, a mutual inductance is produced in the magnet coil 13 during movement of the armature 20. This mutual inductance can be recognized by a corresponding evaluating circuit or by a control device as an armature movement. Furthermore, the armature stroke is dependent tolerances very little since it is produced accurately over the pressing depth of the valve ball 19 in the bottom 23 of the armature 20, and the valve ball 19 can be manufactured in a mass production with high accuracy. Since the armature 20 is formed with a punch drawn element, it has a relatively small mass and thereby a high adjusting speed during a change in the current supply to the magnetic coil 13.

Finally, it should be mentioned that instead of the valve ball 19, also the bottom 23 of the portion 22 can be used as a valve element when the part of the bottom 23 facing the seat 18 is correspondingly shaped for example in form of a semi-sphere.

It will be understood that each of the elements described above, or two or more together, may also find a useful application in other types of constructions differing from the types described above.

While the invention has been illustrated and described as embodied in an electromagnetically operated pressure switching valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetically operated pressure switching valve, comprising a valve housing; a magnet coil arranged inside said valve housing; a magnet core associated with said magnet coil and having a passage for a pressure medium provided with a seat valve; a magnet armature; a valve element arranged in said valve housing for controlling a flow of the pressure medium, said magnet armature having a sleeve-shaped portion extending in said magnet coil to an area of a greater magnetic flux density and provided in said area with a bottom, said bottom and said portion forming a U-shaped cross-section, said valve element being arranged in said bottom, said portion of said magnet armature cooperating with said valve seat of said passage, said portion of said magnet armature having a ring-shaped circular flange-like edge extending outside of said magnet coil.

2. An electromagnetically operated pressure switching valve as defined in claim 1, wherein said portion of said magnet armature extends at least to one-third in said magnet coil.

3. An electromagnetically operated pressure switching valve as defined in claim 1, wherein said magnet armature has a plurality of passages for the pressure medium.

4. An electromagnetically operated pressure switching valve as defined in claim 1, wherein said magnet armature is formed as a one-piece punch drawn element.

5. An electromagnetically operated pressure switching valve as defined in claim 1, wherein said valve element is formed as a valve ball which is pressed in said bottom and serves as a closing member for said passage.

6. An electromagnetically operated pressure switching valve as defined in claim 1, wherein said valve element is formed as a stamped part of said bottom.

7. An electromagnetically operated pressure switching valve as defined in claim 1, wherein said edge is formed as a supporting collar provided on an end side facing said magnet coil.

8. An electromagnetically operated pressure switching valve, comprising a valve housing; a magnet coil arranged inside said valve housing; a magnet core associated with said magnet coil and having a passage for a pressure medium provided with a valve seat; a magnet armature; a valve closing element arranged in said valve housing for controlling a flow of the pressure medium, said magnet armature having a portion extending in said magnet coil to an area of a greater magnetic flux density, said portion of said magnet armature cooperating with said valve seat of said passage, said portion of said magnet armature being limited by a ring-shaped circular flange-like edge extending outside of said magnet coil; and a spring which surrounds said portion of said magnet armature and abuts against said magnet core and said edge.

9. An electromagnetically operated pressure switching valve, comprising a valve housing; a magnet coil arranged inside said valve housing; a magnet core associated with said magnet coil and having a passage for a pressure medium provided with a valve seat; a magnet armature; a valve closing element arranged in said valve housing and providing a flow of the pressure medium, said magnet armature having a portion extending in said magnet coil to an area of a greater magnetic flux density, said portion of said magnet armature cooperating with said valve seat of said passage, said portion of said magnet armature being limited by a ring-shaped circular flange-like edge extending outside of said magnet coil, said valve closing element having a projection which extends into a recess formed in said portion and is formed as a pressure medium passage cooperating with said valve closing element.

* * * * *